United States Patent
Sirpal et al.

(10) Patent No.: US 10,104,440 B2
(45) Date of Patent: Oct. 16, 2018

(54) SYSTEM AND METHOD FOR DIGITAL TELEVISION OPERATION AND CONTROL INTERFACE PRESENTATION

(71) Applicants: Jamdeo Canada Ltd., Oakville (CA); Hisense Electric Co., Ltd., Qingdao, Shandong (CA); Hisense USA CORP., Suwanee, GA (US); Hisense International Co., Ltd., Qingdao (CN)

(72) Inventors: Sanjiv Sirpal, Oakville (CA); Alexander De Paz, Oakville (CA); Mohammed Selim, Oakville (CA); Salvador Soto, Oakville (CA); Saulo Dourado, Oakville (CA); Fuqu Wu, Oakville (CA); Dean Britto, Oakville (CA); Ken Leung, Oakville (CA)

(73) Assignees: JAMDEO CANADA, LTD., Ontario (CA); HISENSE ELECTRIC CO., LTD., Qingdao (CN); HISENSE USA CORP., Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 25 days.

(21) Appl. No.: 15/354,914

(22) Filed: Nov. 17, 2016

(65) Prior Publication Data
US 2018/0139505 A1    May 17, 2018

(51) Int. Cl.
*H04N 21/485*    (2011.01)
*H04N 21/45*    (2011.01)
(Continued)

(52) U.S. Cl.
CPC ....... *H04N 21/4858* (2013.01); *G06F 3/0482* (2013.01); *G06F 3/0483* (2013.01);
(Continued)

(58) Field of Classification Search
CPC .......... H04N 21/4858; H04N 21/4312; H04N 21/4532; H04N 21/4854
See application file for complete search history.

(56) References Cited

U.S. PATENT DOCUMENTS 6,678,891 B1 *   1/2004   Wilcox .............. G06Q 30/0601
                                                  348/E5.105
7,681,141 B2 *   3/2010   Tu .......................... G06F 3/0485
                                                  715/763
(Continued)

*Primary Examiner* — Alexander Q Huerta
(74) *Attorney, Agent, or Firm* — Gordon & Rees LLP

(57) ABSTRACT

The present disclosure relates to digital television processes and systems. In one embodiment, a method for control of a digital television includes detecting a first command for presentation of a control interface for the digital television, and presenting the control interface, wherein the control interface is presented to include an expanded tab element configured to provide a plurality of selectable elements associated with a category of the expanded tab element, and a plurality of tab elements configured in a horizontal bar configuration on a display of the digital television, the expanded tab element presented within the horizontal bar. The method also includes detecting a command for the control interface to select one of the plurality of tab elements, and updating presentation of the control interface in response to the second command, wherein the digital television presents a selected tab element with expanded configuration and provides a plurality of graphical elements.

20 Claims, 12 Drawing Sheets

(51) Int. Cl.
  *G06F 3/0483* (2013.01)
  *G06F 3/0482* (2013.01)
  *H04N 21/431* (2011.01)
(52) U.S. Cl.
  CPC ..... *H04N 21/4312* (2013.01); *H04N 21/4532* (2013.01); *H04N 21/4854* (2013.01)

(56) References Cited

U.S. PATENT DOCUMENTS

| | | | | |
|---|---|---|---|---|
| 7,831,987 B2* | 11/2010 | Shikata | ............... | H04H 40/18 |
| | | | | 715/838 |
| 8,201,104 B2* | 6/2012 | Yamamoto | ............. | A63F 13/10 |
| | | | | 348/E5.105 |
| 8,239,894 B2* | 8/2012 | Utsuki | ............... | H04N 5/44543 |
| | | | | 715/700 |
| 2003/0001898 A1* | 1/2003 | Bernhardson | ......... | G06F 3/0482 |
| | | | | 715/786 |
| 2005/0235209 A1* | 10/2005 | Morita | ............... | G06F 3/0482 |
| | | | | 715/716 |
| 2008/0082935 A1* | 4/2008 | Relyea | ............... | G06F 3/0483 |
| | | | | 715/777 |
| 2008/0148335 A1* | 6/2008 | Dawson | ............ | H04N 21/4104 |
| | | | | 725/132 |
| 2009/0222757 A1* | 9/2009 | Gupta | ............... | H04N 5/44543 |
| | | | | 715/776 |
| 2012/0206652 A1* | 8/2012 | Yi | ..................... | H04N 5/44591 |
| | | | | 348/570 |
| 2014/0215380 A1* | 7/2014 | Kang | .................. | G06F 3/0483 |
| | | | | 715/781 |
| 2015/0304717 A1* | 10/2015 | Kim | ................... | G06Q 30/0269 |
| | | | | 725/59 |
| 2015/0331551 A1* | 11/2015 | Lee | ................... | G06F 3/04817 |
| | | | | 715/781 |

* cited by examiner

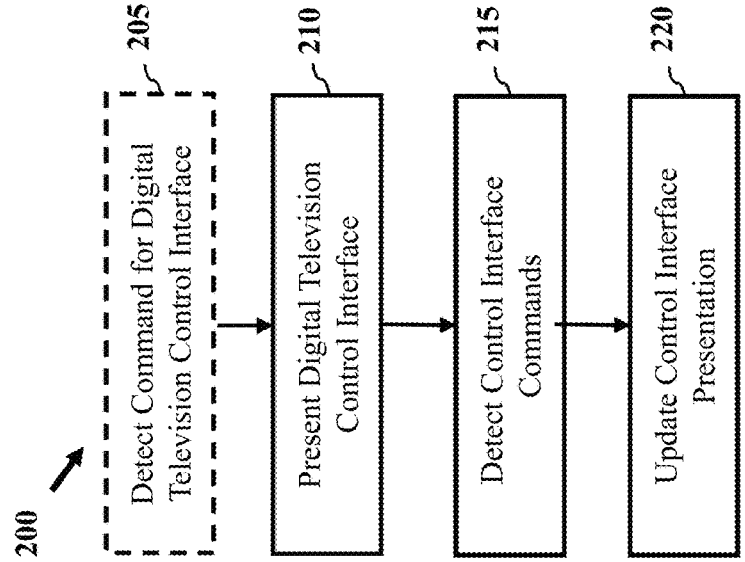

SYSTEM AND METHOD FOR DIGITAL TELEVISION OPERATION AND CONTROL INTERFACE PRESENTATION

FIELD

The present disclosure relates to electronic devices and applications, and more particularly to display and content presentation devices.

BACKGROUND

Recent television devices are designed and developed to provide application and network services in addition to traditional television functions for display of broadcasted content. With the addition of functionalities and components on television devices, there exists a need for control interfaces for applications and television components. In particular, there exists a need for programs and configurations that allow for features of the applications to be presented, accessed and customized on a digital television. While execution of an application and application interfaces exist for digital televisions, there exists a need for improved control of television features. It can be difficult for device manufactures to provide menu based configurations that fit all devices across different product markets. Moreover, there exists a desire for interfaces to be customizable. Conventional on-screen interfaces do not allow for customization. Moreover, the conventional interfaces require complex menus with distracting elements and can require extraneous actions for use. There is a desire for modified configurations to optimize control and experience of digital televisions.

BRIEF SUMMARY OF THE EMBODIMENTS

Disclosed and claimed herein are methods, devices and systems for control of a digital television. One embodiment is directed to a method including detecting, by a digital television, a first command for presentation of a control interface for the digital television. The method also includes presenting, by the digital television, the control interface, wherein the control interface is presented to include an expanded tab element configured to provide a plurality of selectable elements associated with a category of the expanded tab element, and a plurality of tab elements configured in a horizontal bar configuration on a display of the digital television, the expanded tab element presented within the horizontal bar. The method also includes detecting, by the digital television, a second command for the control interface to select one of the plurality of tab elements, and updating, by the digital television, presentation of the control interface in response to the second command, wherein the digital television presents a selected tab element with expanded configuration and provides a plurality of graphical elements.

In one embodiment, presenting the control interface includes presentation of the extended tab element and plurality of tab elements as at least one of a bottom bar and middle bar control interface overlaying display content of the digital television.

In one embodiment, the control interface includes graphical elements determined by the digital television based on one or more of a setup procedure and use of the digital television.

In one embodiment, presenting the control interface includes presentation of a tab element configured for personalization, at least one tile element for selecting content for presentation by the display device, tile element for settings and a tile for live content.

In one embodiment, the second command is a navigational command to select a tab element with respect to the control interface.

In one embodiment, the control interface for the digital television is configured as a hierarchical navigation pattern, wherein selections of tab elements present one or more sheet views by the digital television.

In one embodiment, updating presentation of the control interface in response to the second command includes presentation of a digital television setup interface configured to include a personalization screen, avatar selection screen, wallpaper selection screen and notification settings screen.

In one embodiment, updating presentation of the control interface in response to the second command includes presentation of a personalization interface associated with a user of the digital television.

In one embodiment, updating presentation of the control interface in response to the second command includes personalization of an avatar element of the control interface to include a user selected image and updating background image data for one or more tab elements.

In one embodiment, the control interface is presented based on a selected user profile generated by a setup process of the digital television.

Another embodiment is directed to a digital television including a display configured to present a control interface and a processor coupled to the display. The processor is configured to detect a first command for presentation of a control interface for the digital television. The processor is configured to present the control interface, wherein the control interface is presented to include an expanded tab element configured to provide a plurality of selectable elements associated with a category of the expanded tab element, and a plurality of tab elements configured in a horizontal bar configuration on a display of the digital television, the expanded tab element presented within the horizontal bar. The processor is configured to detect a second command for the control interface to select one of the plurality of tab elements, and update presentation of the control interface in response to the second command, wherein the digital television presents a selected tab element with expanded configuration and provides a plurality of graphical elements.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 2 depicts a process for control of a digital television according to one or more embodiments;

FIG. 3 depicts a process for control of a digital television according to one or more other embodiments;

DETAILED DESCRIPTION OF THE EXEMPLARY EMBODIMENTS

Overview and Terminology

One aspect of the disclosure relates to providing a control interface for a digital television. In one embodiment, a system and framework are provided for presentation of a control interface including a plurality of tab elements or tiles arranged in a horizontal configuration. In one embodiment one tab of the control interface may be presented with an expanded view to allow for presentation of additional elements associated with one or more of the character or type of the expanded tab. The control interface may also be configured to allow for a hierarchical navigation format configuring successive presentation formats with each selection of the control interface.

Another aspect is directed to personalization of control interface. In one embodiment, features of the control interface may be modified or personalized. In additional the control interface may store and allow for operation of a plurality of user profiles/personal control interfaces.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
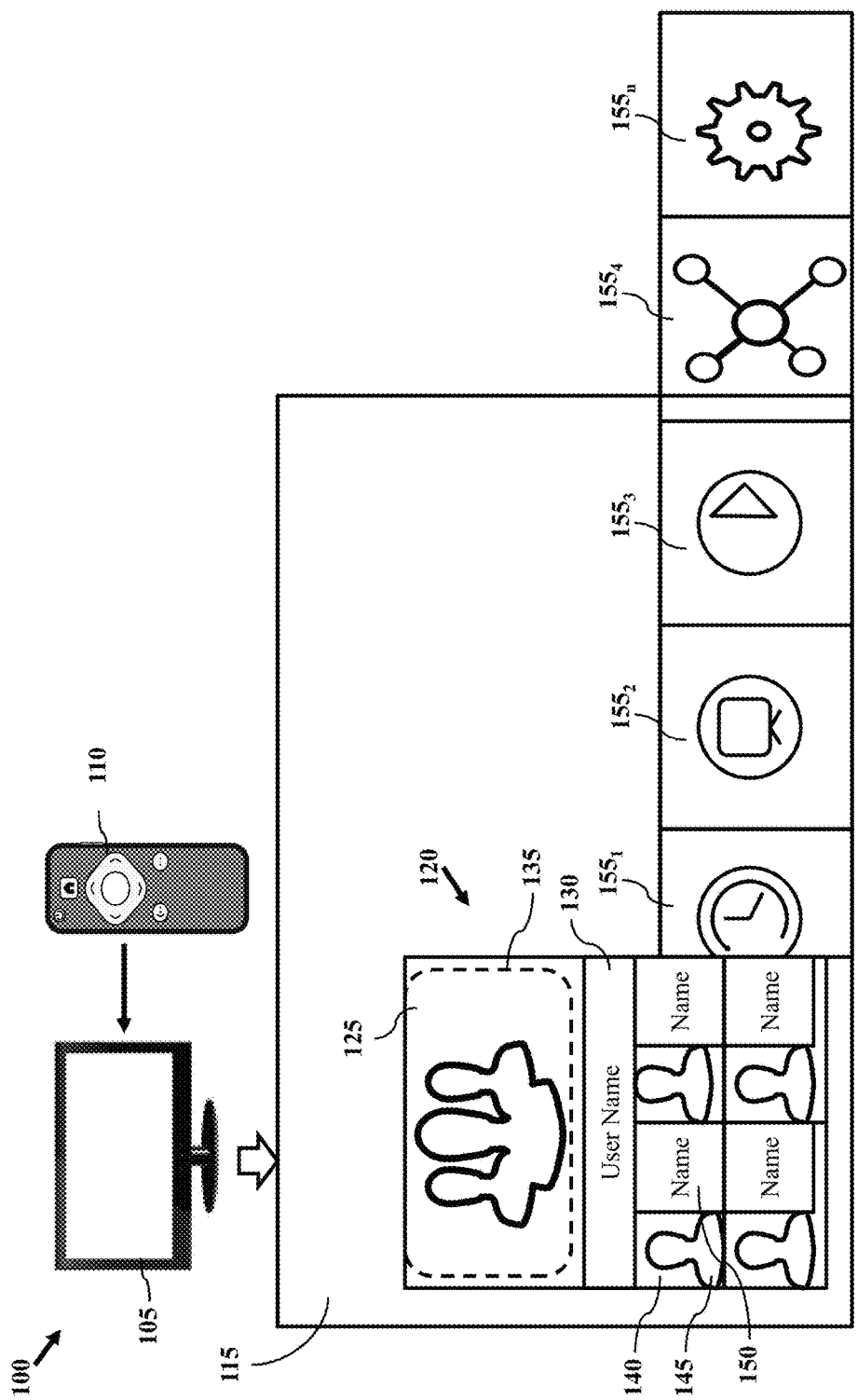
FIG. 1 depicts a graphical representation of a digital television control interface according to one or more embodiments.

Referring now to the figures, FIG. 1 depicts a graphical representation of a system including a digital television configured to present a control interface according to one or more embodiments. System 100 of FIG. 1 depicts digital television 105 and remote control 110. According to one embodiment, digital television 105 includes display 115 configured to present control interface 120. As will be discussed herein, control interface 120 may be employed to control operation of digital television 105. According to another embodiment, control interface 120 may be selected, navigated and updated based on user interactions with digital television 105 and one or more inputs from remote control 110.

According to one embodiment, control interface 120 may include a plurality of tab or tile elements, shown as 125 and $155_{1-n}$. According to another embodiment, based one of the plurality of tab elements may be presented with an extended (e.g., silo, expanded, highlighted, etc.) presentation format, while each of the other tab elements may be presented with a tab format. In addition, a highlight element 135 may be displayed within the extended presentation format, such that commands to move the highlight to a new or different tab element will modify the presentation format of the tab selected by the highlight and return the presentation format of the extended tab element to a tab configuration.

According to one embodiment, expanded tab element 125 relates to a user profile tab including image associated with a selected avatar, and a user name 130. The avatar of extended tab element 125 may be an image or graphical element selected by a user. According to another embodiment, expanded tab element 125 includes a plurality of elements 140 each associated with user profiles available to display device 105. By allowing for multiple user profiles, display device 105 may update the presentation format and operation of control interface 120 depending on the selected user profile. As such, digital television 105 allows for multiple user profiles and for personalization tailored for each user. In FIG. 1, each element 140 includes an avatar image 145 and name for the profile. According to another embodiment, each element 140 is arranged in a grid format within a secondary or lower portion of extended tab element 120, and more particularly below user name 130.

One aspect of the disclosure is to provide a control interface including a plurality of graphical elements that may be selected and interacted using directional commands (e.g., up, down, left, right, etc.) of a remote control, such as remote control 110. Control interface 120 is configured to allow for navigation, and movement of highlight element 135, based on directional commands within an extended tab, such as extended tab 125. According to one embodiment, control interface 120 may be initially presented such that the extended tab element associated with a user profile is the first tab to be displayed in an extended format. In FIG. 1, extended tab is shown on the left side of display 115, however it should be appreciated that the extended tab format may be initially displayed in other positions of the control interface (e.g., middle, right, etc.). Elements 140 of expanded tab element 120 are configured to provide a plurality of selectable elements associated with a category of the expanded tab element, such as user profiles established for digital television 105.

According to one embodiment, elements 140 of control interface 120 are presented by digital television 105 as part of control interface 120. In addition, control interface 120 is presented to include a plurality of tab elements $155_{1-n}$ configured in a horizontal bar configuration on a display of digital television 105 and expanded tab element 120 is presented within the horizontal bar. According to one embodiment, tab elements $155_{1-n}$ may include one or more elements, recordings $155_1$, live television $155_1$, video on demand $155_1$, applications $155_1$, and settings $155_n$. According to one embodiment, a portion of the tab elements $155_{1-3}$ is displayed on display 115, such that elements 155$_{3-n}$ may be navigated and presented on display 115. According to another embodiment, presentation of tab elements 155$_{1-n}$ includes display of a symbol within each tab element and may also include a wallpaper or background image. In that fashion, tab elements 155$_{1-n}$ may be personalized and/or distinguished based on past use of digital television 105.

Control interface may be a navigation bar, which is part of a hierarchy of control interface presentations. In one embodiment it is the starting point for accessing elements and menus of digital television 105. According to another embodiment, control interface 120 is associated with one or more setup procedures for digital television 105. According to yet another embodiment, control interface may be associated with a chip view for accessing features and information related to displayed content.

As will be discussed in more detail below, presentation of control interface 120 may be in response to a command from remote control 110, such as selection of a home or menu key. According to another embodiment, control interface 120 may be displayed shortly after a power on of digital television 105. According to another embodiment control interface 120 may be presented following presentation of a wake animation and prior to display of a sleep or shutdown animation. In certain embodiments, presentation of control interface 120 includes a horizontal bar of all tab elements, wherein one tab element is then updated to be displayed in an expanded tab view following a user input or selection of that tab element. Second, or additional input commands, the presentation format of control interface 120 may be modified. The following figures include additional embodiments associated with controlling operation of digital television 105.

FIG. 2 depicts a process for control of a digital television according to one or more embodiments. Process 200 may be employed to for control and/or presentation of a control interface (e.g., control interface 120). By way of example, process 200 may be employed to presentation of a control interface of a digital television. Process 200 may be performed by a digital television (e.g., digital television 105).

Process 200 may be initiated by presenting a control interface for a digital television at block 210. In one embodiment, the control interface is presented at block 210 to include an expanded tab element configured to provide a plurality of selectable elements associated with a category of the expanded tab element, and a plurality of tab elements configured in a horizontal bar configuration on a display of the digital television. The expanded tab element (e.g., extended tab element 125) may be presented within the horizontal bar, and position on a left side, middle or right side of the control interface when initially displayed. According to another embodiment, the control interface includes presentation of the extended tab element and plurality of tab elements as at least one of a bottom bar and middle bar control interface overlaying display content of the digital television.

According to another embodiment, presenting the control interface at block 210 includes graphical elements determined by the digital television based on one or more of a setup procedure and use of the digital television. By way of example, tab elements may relate to live or fluid graphical elements that may be updated based on use of the digital television, selections, available content, personalization settings, etc. Thus, presentation of the control interface at a first point in time may include similar but different elements or configurations at a later point in time. By way of further example, in certain embodiments, one or both of the listing of tab elements and order of tab elements may remain the same, however presentation attributes of the tab elements and in particular graphical elements of the extended presentation format may be modified and updated by the digital television.

According to another embodiment, tab elements of the control interface may include different categories or types of content and control features to be accessed. According to one embodiment, the control interface includes presentation of tab elements configured for personalization, at least one tile element for selecting content for presentation by the display device, a tile element for settings and a tile for live (e.g., broadcast) content. It should be appreciated that other types of tiles may be included as discussed herein. According to another embodiment, the presentation format for a control interface may be based on based on a selected user profile generated by a setup process of the digital television. As such, user preferences of tab elements more frequently used may be more prominently displayed based on use of the digital television.

In certain embodiment, process 200 may optionally detect a command for a control interface at block 205 prior to presentation of the control interface at block 210. By way of example, during a viewing operation of a digital television, a home or menu command may be transmitted to the digital television to initiate display of the control interface. In other embodiments, the control interface may be displayed following a power on operation or other operation of the digital television.

At block 215, the digital television detects a second command for the control interface to select one of the plurality of tab elements. In one embodiment, selection of a tab element may at block 215 include positioning a highlight element on a particular tab element. According to another embodiment, selection of a tab element at block 205 relates to a navigational command to select a tab element, portion of a tab element, or navigation command in general with respect to the control interface. One or more control interface commands may be detected at block 215. According to one embodiment, control interface commands at block 215 relate to input commands for a control interface of the digital television configured as a hierarchical navigation pattern. In certain embodiments, selections of tab elements result in the digital television presenting one or more sheet views by the digital television. According to another embodiment, selections of tab elements results in launching a TV operation or application such as video on demand, a camera application, etc.

At block 220, the digital television updates presentation of the control interface in response to the commands detected at block 215 (e.g., second command). By way of example, the digital television can presents a selected tab element with expanded configuration and provides a plurality of graphical elements. According to another embodiment, updating presentation of the control interface in response to the second command can include presentation of a digital television setup interface configured to include a personalization screen, avatar selection screen, wallpaper selection screen and notification settings screen. In another embodiment, updating presentation of the control interface in response to the second command can include presentation of a personalization interface associated with a user of the digital television. According to another embodiment, updating presentation of the control interface in response to the second command can include personalization of an avatar element of the control interface to include a user selected image and updating background image data for one or more tab elements.

Process 200 discusses, in part, operations of commands within a control interface (e.g., control interface 120) and updating presentation of the control interface. According to another embodiment, control interface commands can produce presentation of other forms or configurations of control interfaces. FIG. 3 depicts a process for presentation of other forms of control interfaces according to one or more embodiments. Process 300 may be initiated by detecting a control interface commands at block 305. By way of example, these commands may include navigation within and/or selection of control interface elements. At block 310, the digital television updates the presentation of the control interface. According to another embodiment, process 300 may then proceed with one or more setup or control configurations.

At block 315, TV setup relates to a process for setting up the digital television, such as a guided presentation that allows for selection of settings based on displayed options as will be discussed more detail below with respect to FIGS. 11-12, for example. At block 320, AV setup relates to a menu for configuration display and sound options of the digital television. At block 325, a menu may be presented for input devices connected to the digital television. In that fashion, the digital television may be an intermediary between the input devices available to provide content to the digital television. A block 330, one or more options may be selected to personalize the control interface.

Figure 4:
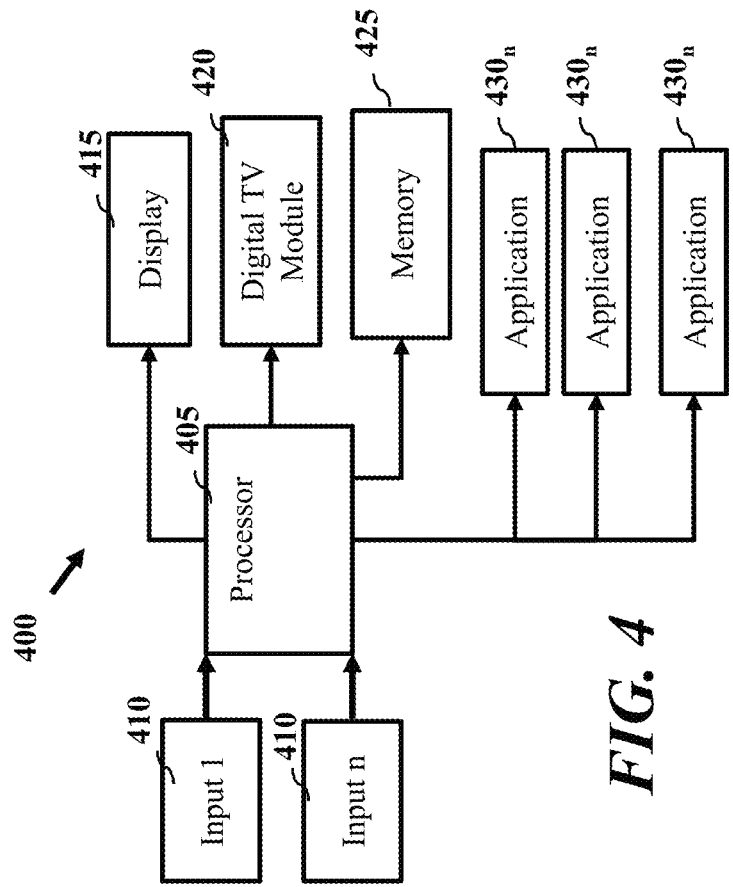
FIG. 4 depicts a simplified diagram of a digital television according to one or more embodiments.

FIG. 4 depicts a simplified diagram of a digital television according to one or more embodiments. Digital television 400 includes processor 405, inputs 410, display 415, digital TV module 420, memory 425, and applications $430_{1-n}$. It should be appreciated that digital television 400 may include one or more additional components not shown in FIG. 4. Digital television 400 is configured to present a control interface as described herein.

Inputs 410 relate to physical inputs for receiving video/image content and/or network data for presentation of content on display 415. Digital TV module 420 includes decoder/converter elements to receive information and content from inputs 410 which is then formatted and output to processor 405 for presentation on display 415. Memory 425 may include ROM and RAM memory for operation of digital television 400 and processor 405.

Processor 405, in addition to controlling operation of a digital television, is configured to control presentation and operation of a control interface. According to one embodiment, processor 405 is configured to detect commands for presentation of a control interface for the digital television, present the control interface including an expanded tab element and a plurality of tab elements. Processor 405 may also detect second or additional commands for the control interface to select one of the plurality of tab elements and update presentation of the control interface in response to the commands.

Figure 5:
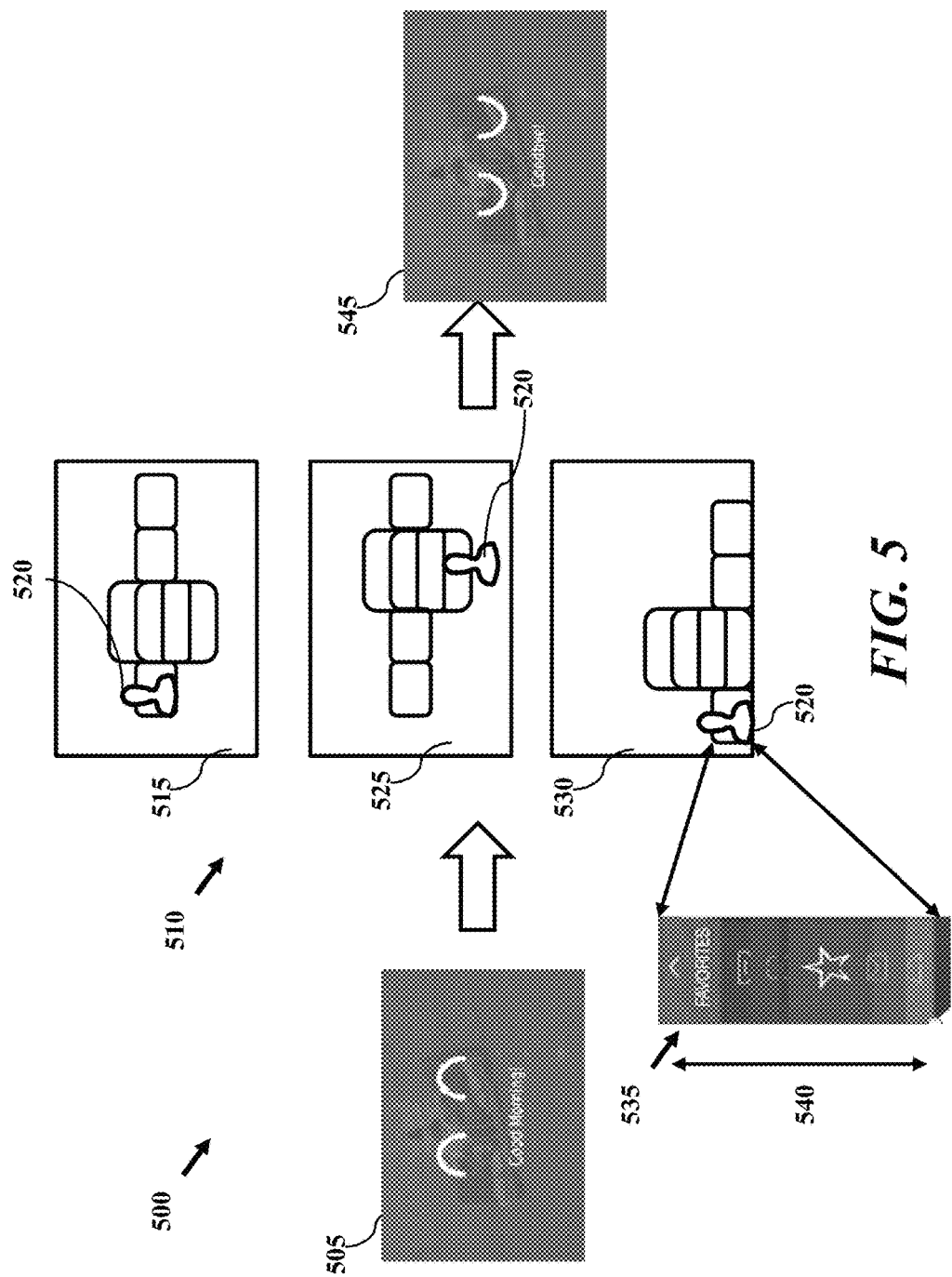
FIG. 5 depicts a graphical representation of digital television operation according to one or more embodiments.

FIG. 5 depicts a graphical representation of digital television operation according to one or more embodiments. According to one embodiment, presentation of a control interface can include one or more configurations. According to certain embodiments, elements and features of the control interface can be updated and/or personalized. In addition, the control interface may be presentation with accompanying elements. Process 500 depicts control interface presentation formats with wake/sleep elements according to one or more embodiments.

Process 500 depicts operation of a digital television for presentation of a control interface. In one embodiment, process 500 displays wake animation 505 shortly after or during startup of the digital television. Wake animation make relate to graphical elements and/or a message that is either custom or selected from a prearranged set of messages to be displayed for 1-5 seconds. Following wake animation 505, a control interface may be presented. In other embodiments, a control interface may be presented following detection of a command (e.g., home, menu, etc.). Exemplary control interface configurations 510 include middle bar configuration 515, cross configuration 525 and bottom bar configuration 530. In one embodiment, one of the configurations will be displayed when prompted, however, using the control interface, a setting or preference of format for the control interface may be stored by the digital television.

According to another embodiment, a control interface includes a personal or user tab/tile shown as avatar/personal block 520. According to one embodiment, the position of avatar/personal block 520 for middle bar configuration 515, cross configuration 525 and bottom bar configuration 530 may all differ. Middle bar configuration 515 includes avatar/personal block 520 on the left side of the interface with a horizontal row of tab elements extending across the middle of a digital television display. Cross configuration 525 similarly includes a horizontal row of tab elements extending across the middle of a digital television display, however, the avatar/personal block 520 for cross configuration 525 is position in the middle/right hand position of the horizontal bar. Bottom bar configuration 530 is similar to middle bar configuration 515, however, the horizontal par is located near the lower or bottom portion of the digital television. Following display of a control interface format 510, the digital television may display additional menus, guided setup, content and/or other television features. However, during a power down operation, prior to completely shutting of the display, the digital television may present a sleep graphic 545.

According to another embodiment, added functionality may be provided to the control interfaces by providing a scrollable list of tab elements 535 adjacent to a lateral portion of the horizontal bar of tab elements. Scrollable list of tab elements 535 may be scrollable in a vertical direction and allow for selection of one or more tab elements from the list.

Figure 6:
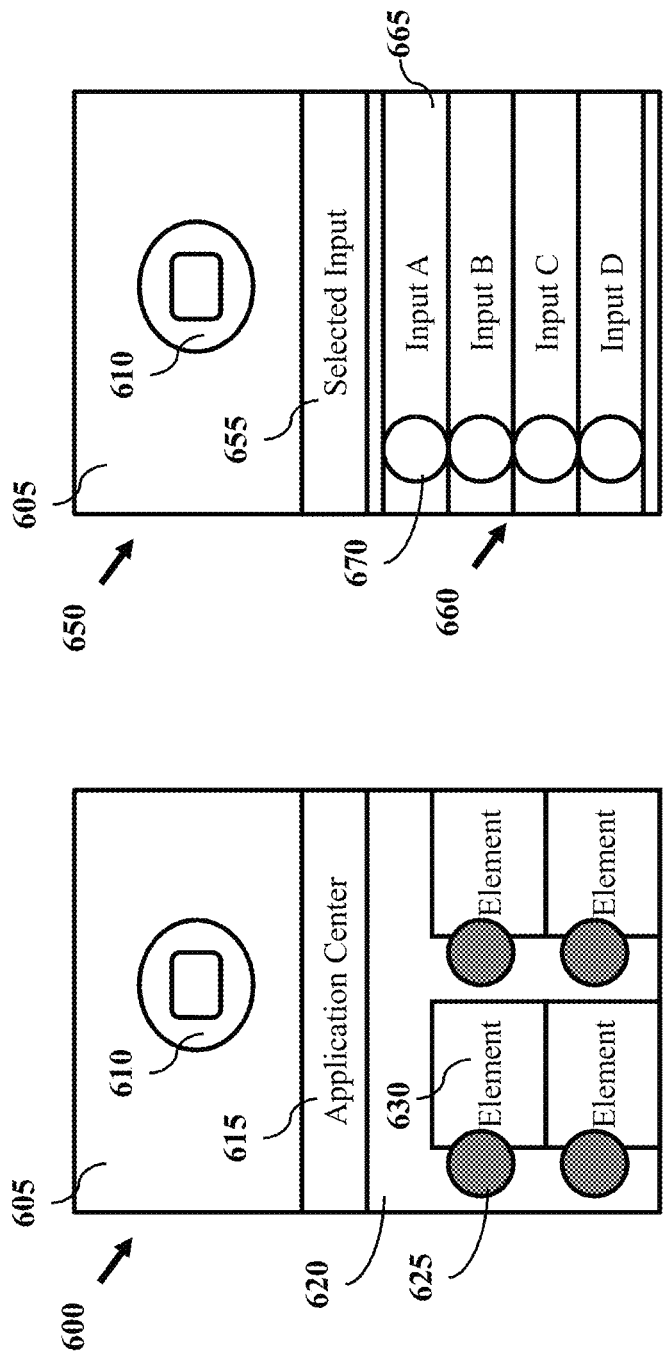
FIGS. 6A-6B depict graphical representations control interface elements according to one or more embodiments.

FIGS. 6A-6B depict graphical representations control interface elements according to one or more embodiments. As discussed above, a control interface as discussed herein may include a hierarchical navigation. FIGS. 6A-6B depicts exemplary configurations for expanded tab formats. According to one embodiment, tab elements are configured such to have similar display attributes, such as structure of the tile elements. Referring first to FIG. 6A, expanded tab elements 600 includes top portion 605, symbol 610, identification/name 615 and bottom portion 620. Top portion 605 may include a particular color or wallpaper. In certain embodiments, for a personal tab element, top portion may include a user avatar or user image. For applications of the digital television, top portion may include an image generated from a screen grab associated with the applications (e.g., screenshot for TV tab, application snapshot for an application tab, etc.). Symbol 610 may be presented based on the type of elements associated with the tab, such that a video on demand symbol would identify the tab as such. According to one embodiment, expanded tab element 600 includes a plurality of graphical elements arranged in a grid formation. Each of the graphical elements includes an icon 625 and an identifier 630.

FIG. 6B depicts an expanded tab element 650 including similar elements to those of FIG. 6A. In FIG. 6B, identification/name 655 is directed to a category of elements (e.g. inputs, etc.) and includes a list of elements 660 associated with the category. The list of elements 660 includes an identifier 665 and graphical symbol 670.

According to one embodiment, tab elements 600 and 650 relate to elements within a control interface. As will be described below, tab elements may be displayed as standalone chips in other embodiments. According to another embodiment, tab elements 600 and 650 each include several display elements, which may be tailored based on the type of category assigned to the tab By way of example, the actual titles listed for video on demand and presentation format (e.g. grid vs. list) may be based on control interface settings for video on demand.

Figure 7:
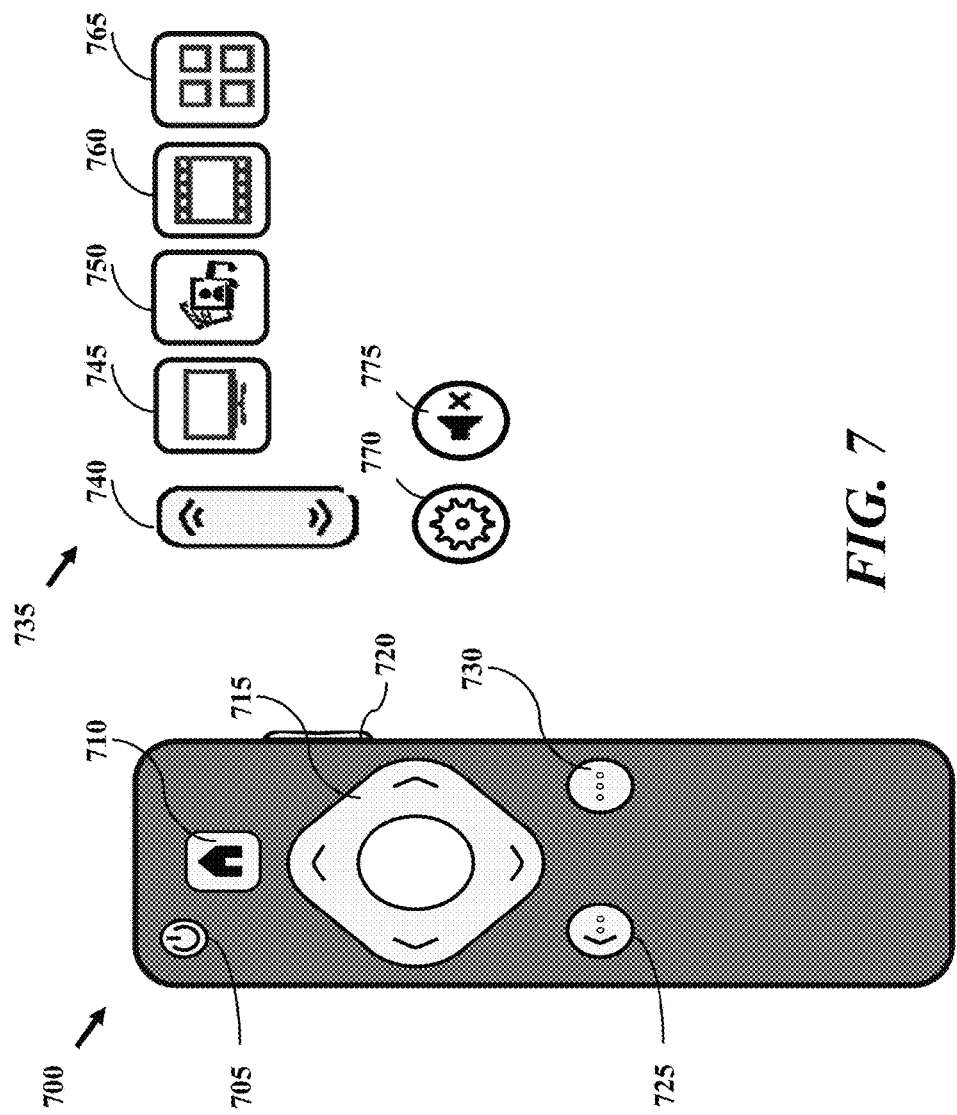
FIG. 7 depicts a graphical representation of a control device according to one or more embodiments.

FIG. 7 depicts a graphical representation of a control device according to one or more embodiments. According to one embodiment, the design and configuration of a control interface is associated with controls of a remote control. In addition, the configuration of the control interface allows for inputs of a remote control device to be minimized. FIG. 7 depicts an exemplary remote control configuration for operation with a control interface. Remote control 700 includes power button 705 (to turn on and off a digital television), home 710, directional pad and select 715, back 725, menu 730, and volume up/volume down 720. According to one embodiment, remote control 700 may be employed to navigate and select elements of a control interface using directional pad and select 715. According to anther embodiment, remote control 700 may optionally include buttons 735 related to channel up/down 740, live TV 745, media center 750, video on demand 760, applications 765, settings 770, and mute 775.

Figure 8:
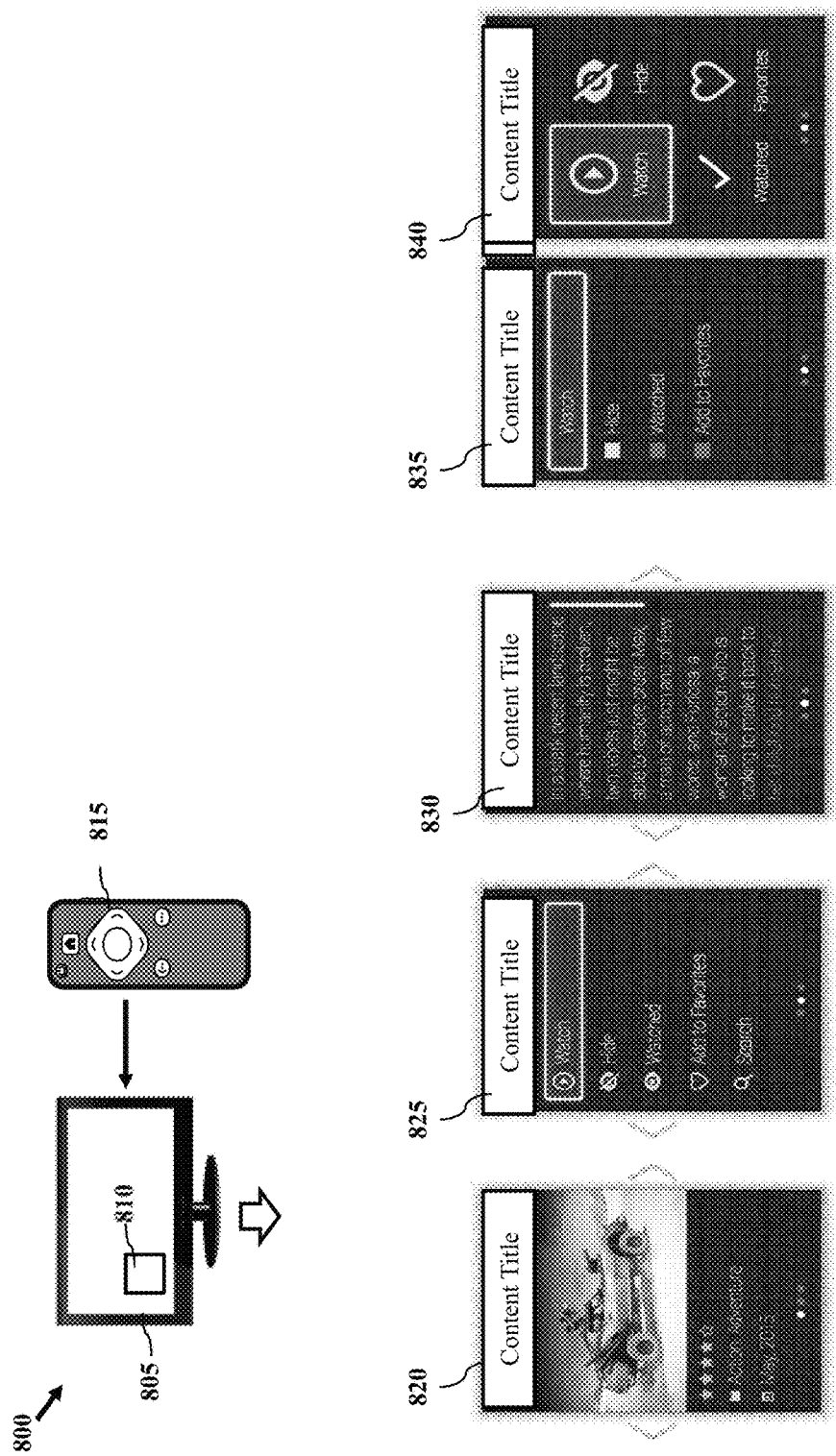
FIG. 8 depicts a graphical representation of chip operation according to one or more embodiments.

FIG. 8 depicts a graphical representation of chip operation according to one or more embodiments. System 800 of FIG. 8 depicts digital television 805 and remote control 815. According to one embodiment, digital television 805 includes a display configured to present chip menu 810. According to one embodiment, chip menu 810 includes presentation of a control interface wherein a single tab element is presented as an overlay to display content (e.g., live TV, Video on demand, etc.). According to another embodiment, presentation of the chip menu 810 may be based on the particular content presented. According to another embodiment, direction commands received by digital television 805 may be detected and employed to modify or shirt among available chips/tiles associated with chip menu 805.

FIG. 8 depicts a chip menu 805 with tab elements/tiles associated with a movie title. However, it should be appreciated that chip elements may be prepared for other forms of content displayed by the digital television including broadcast TV, recorded media, etc. Chip/tab element 820 relates to an informational or guide chip associated with media presented. Chip/tab element 825 relates to functions associated with the media presented, such as watch, search, and chip/tab element 830 provides a text description of the title. Chip menu 805 allows for presentation of one chip and then updating the chip presented based on a left or right directional control. FIG. 8 also depicts exemplary chip/tab elements 835and 840 related to remote commands and audio/video commands, respectively.

In one embodiment, digital television 805 detects a menu button command, displays chip menu 820 and then allows paging through chips 820-840. The chip menu provides a smaller non obtrusive way of accessing info panels and media center hotkeys with more flexibility. Each chip is formatted as a generic informational chip with header, action list, information, shortcut grid, action gird, flexible system to provide multiple types of content. Chips may be flexible and over multiple types of content. Chips 820-840 may be content centric but follow a common pattern. Chips 820-840 can include graphical elements for paging or changing views and may also be scrollable.

Figure 9:
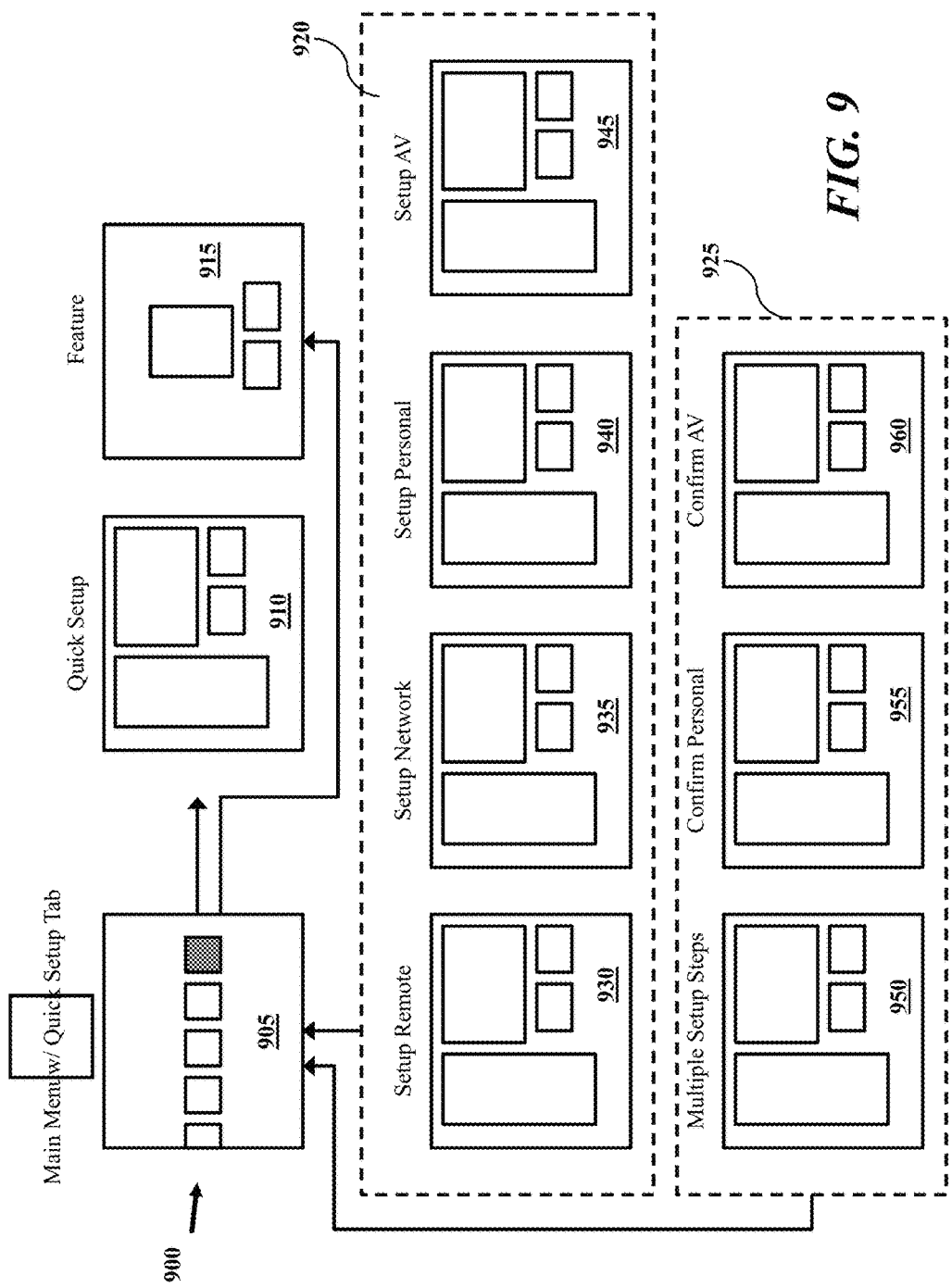
FIG. 9 depicts a graphical representation of control interface setup according to one or more embodiments.

FIG. 9 depicts a graphical representation of control interface setup according to one or more embodiments. According to one embodiment, presentation of a control interface may be based on various levels of setup. Onboarding, to allow for preferences and personalization, can be an essential part of the TV experience. FIG. 9 depicts presentation of a control interface without setup, quick setup and a full setup. According to one embodiment, setup process can be performed for a main menu of a control interface. In one embodiment, control interface 905 is presented. In situation where setup has not been performed, the default control interface format is utilized. According to one embodiment, a quick setup process 910 may be performed including one or more of selection a favorite activity (e.g., live TV, gaming, video, etc.), selection of room lighting, sounds setup and confirmation of preferences. The quick setup may be performed by presented a serious of display screens, where each screen includes a limited number of predefined options that may be easily highlighted with direction buttons of a remote control, selected and the presentation of a next screen with another selection. Presentation of quick setup 910 may allow for presentation of a control interface without personalization of the control interface. In certain embodiments a setup may be performed by selection of control interface 905 for settings of a particular feature with adjust interface 915. Adjustment of a particular feature may be performed following quick setup, or exclusive of any setup.

In certain embodiments a setup wizard 920 includes setup of remote 930, setup of network connections for the digital television 935, setup of personal information 940 and setup of audio video settings 945, in that order according to some embodiments. Set up wizard 920 allows for includes a series of display screens. For setup of remote 930, setup wizard may provide including instructions to press and hold a button or series of buttons, and present display once the remote is paired. Network connection setup 935 can include a list of detected networks, and other selectable features to advanced settings, to scan networks and cancel. For security network setup, can allow for password entry.

Personal setup 940 allows for selection of one or more of an avatar, wall paper, wake/sleep animations, applications and control interface format. AV setup 945, can allow for inputting favorite activities, room settings (brightness) and sound setup.

According to another embodiment, additional setup steps may be performed include multiple setup steps relating the setup wizard 920, confirmation of personal settings 955 and confirmation of AV settings 960 as part of a full setup procedure.

Figure 10:
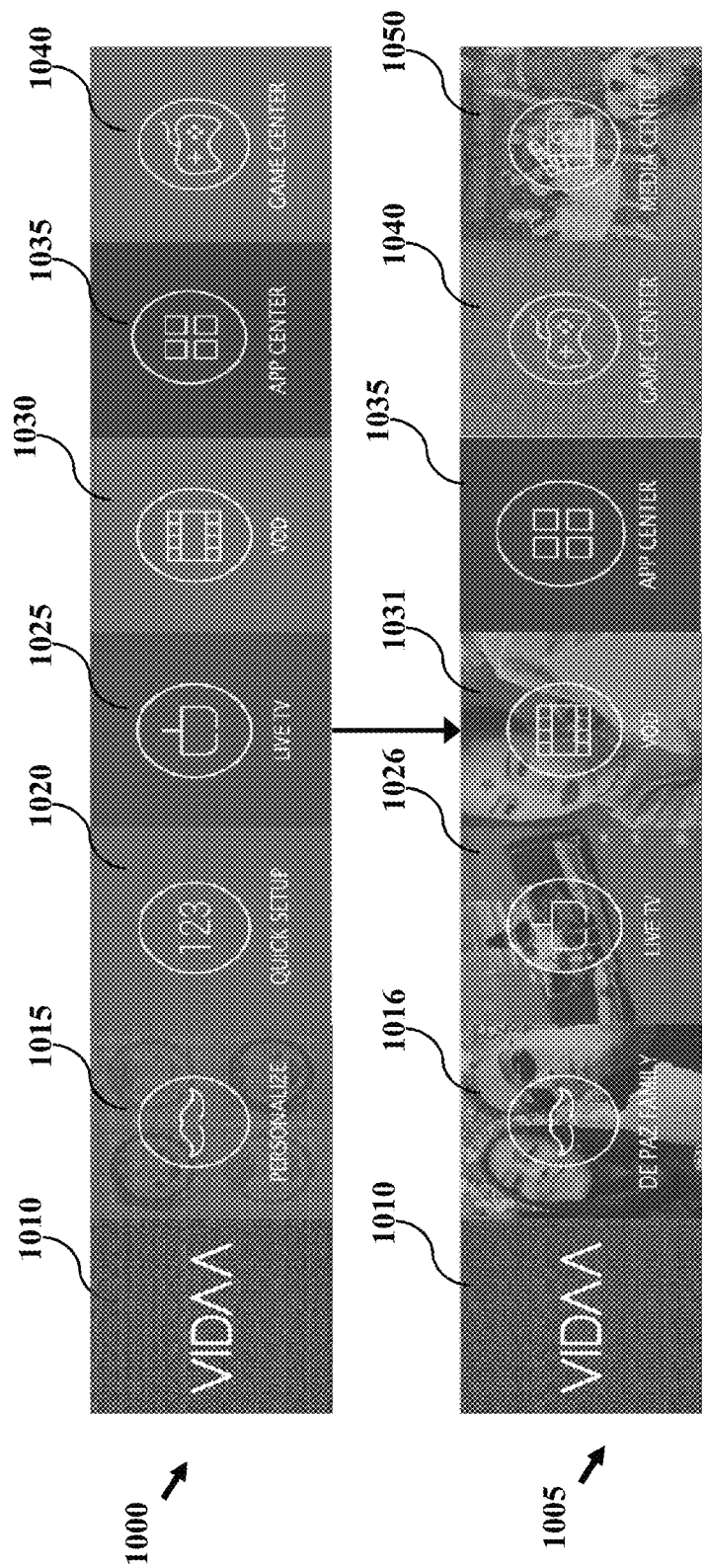
FIG. 10 depicts a graphical representation of control interface setup according to one or more other embodiments.

FIG. 10 depicts a graphical representation of control interface setup according to one or more other embodiments. Control interface 1000 represents a default control interface view including graphic 1010, personal tab 1015, quick setup 1020, live TV 1025, video on demand 1030, application center 1035 and game center 1040. According to one embodiment, this is a default view.

According to another embodiment, following one or more setup procedures, control interface 1005 may be presented. The quick setup may allow for selections of settings and the addition of image data to control interface 1000. Once set up, tab elements of the control interface reflect the new state. Control interface 1005, includes graphic 1010, personal tab 1016 modified with user image data, live TV 1026 modified with TV image data, video on demand 1031, application center 1035 and game center 1040 and media center 1050. In control interface 1005, the order of tab elements is modified based on setup and user profile data provided. In addition, more recently used tab elements will be moved closer to the starting point for a selection point of the control interface.

Figure 11:
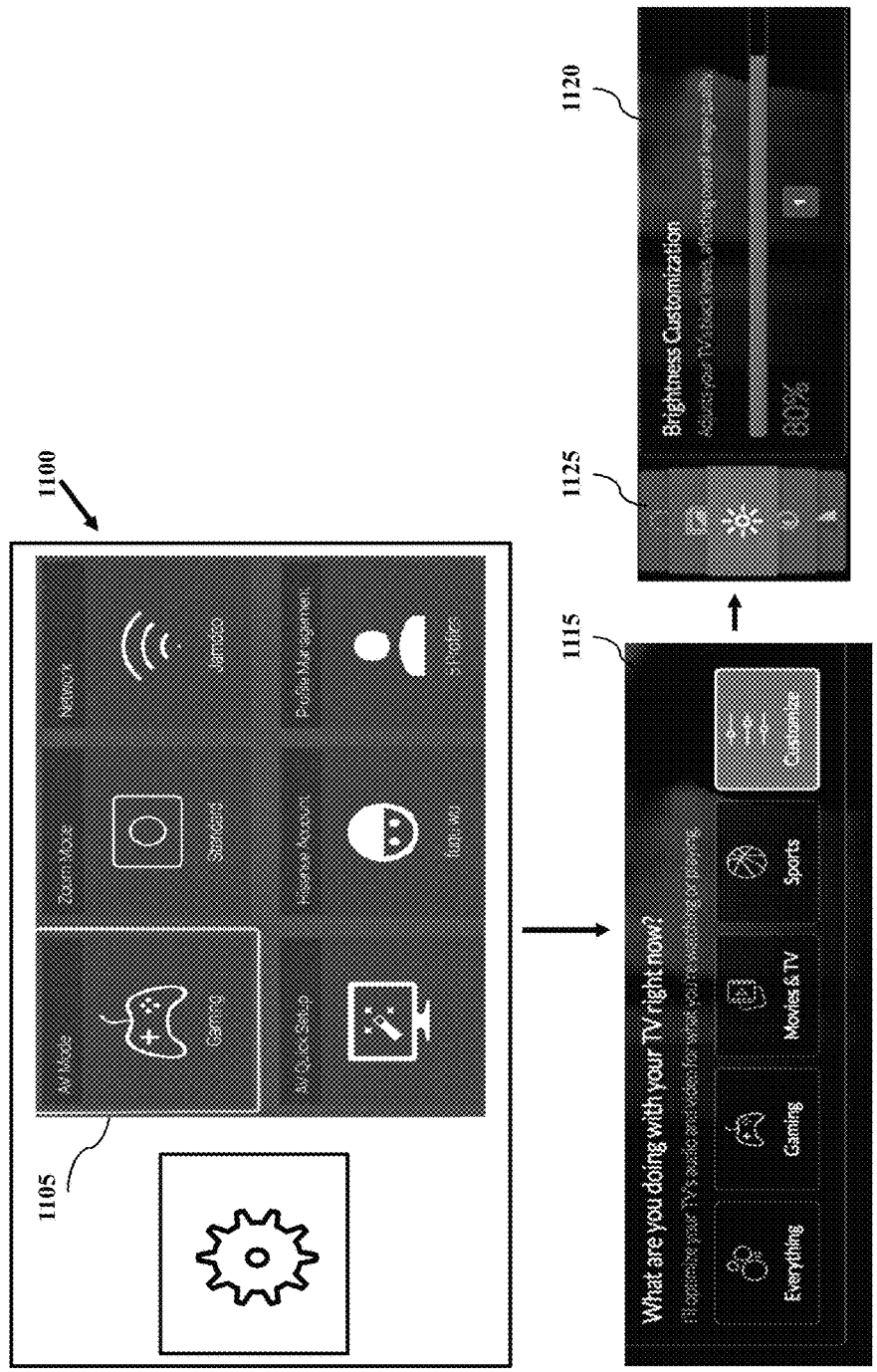
FIG. 11 depicts a graphical representation of settings configurations according to one or more embodiments.

FIG. 11 depicts a graphical representation of settings configurations according to one or more embodiments. According to one embodiment, audio video (AV) setup menu 1100 includes a plurality of graphical elements 1105 which may be display as a sheet associated with another layer of the control interface hierarchy. The configuration of setup menu 1100 may then present window 1115 based on a selection of one of the graphical elements 1105 to allow for additional settings such as customization menu 1120 include an adjustable menu 1125.

Setup menu 1100 is a sheet including one or more graphical elements 1105 for settings, such as AV mode, zoom mode, network, AV quick setup, device account, profile management, language, and region. Window 1115 is displayed as a bottom bar following selection and ability to make changes with the image present. Window 1115 allows for selecting a preset that describes their current activity on the TV. Depending on the selection of window 1115, and in particular a 'Customize' option will launch a separate customization menu 1120, which enables the user to fine-tune individual audio and video settings. Fine-tuning of 'Brightness' via D-pad left and right (which is previewed on-screen), fine-tuning of 'Color Temperature' via a set of individual color presets (which is previewed on-screen), fine tuning of bass and other sound. Zoom mode from the settings pane and zoom options for 4:3 video (which is previewed on-screen) may also be provided by menu 1125.

Figure 12:
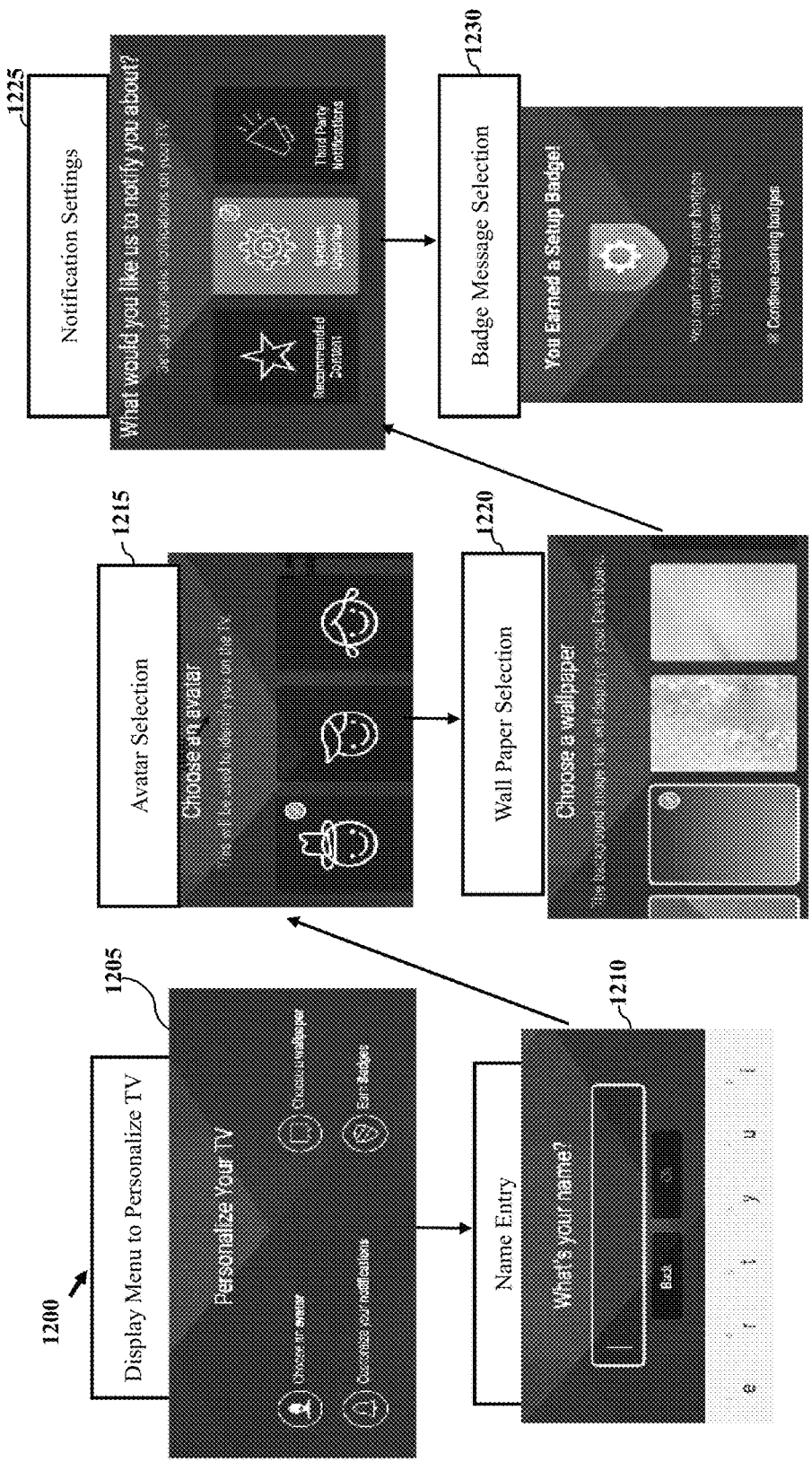
FIG. 12 depicts a graphical representation of control interface personalization according to one or more embodiments.

FIG. 12 depicts a graphical representation of control interface personalization according to one or more embodiments. Process 1200 may be employed for one or more personalization settings. Process 1200 allows for display settings to reflect multiple users. Settings of process 1200 may be employed by a control interface of a digital television. At block 1205, the digital television displays a menu to personalize the digital television identifying the steps of process 1200 and including accept and decline selections. At block 1210, name entry is performed to receive a user name for the settings entered. At block 1215, either a system generated avatar or user image may be input as an avatar image for the user profile. At block 1220, wall paper may be selected for presentation of the control interface and/or a personalization interface. At block 1225, settings may be selected with respect to notifications of systems updates, recommend content and notifications in general. At block 1230, process 1200 present a message including a badge that can be included in a personalization interface for the user.

Figure 13:
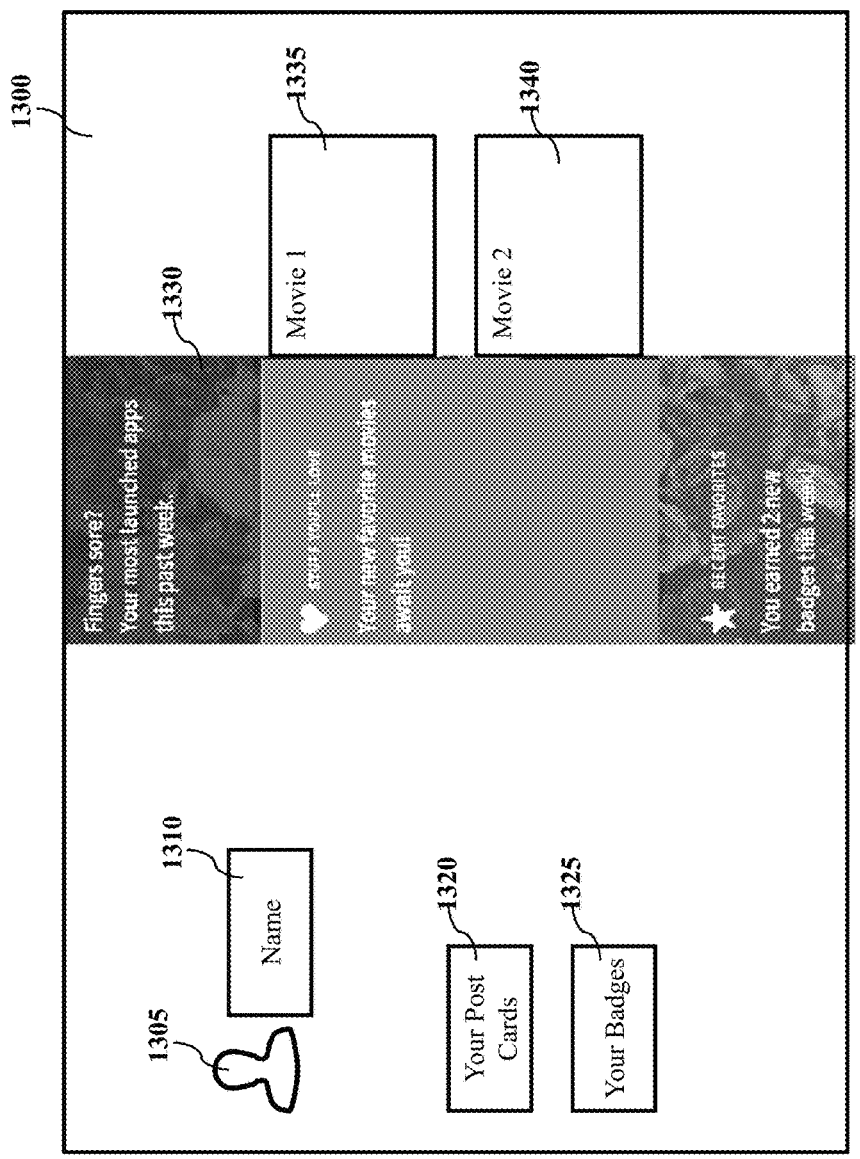
FIG. 13 depicts a graphical representation of a personalization control interface according to one or more embodiments.

FIG. 13 depicts a graphical representation of a personalization control interface according to one or more embodiments. Personalization control interface 1300 provides a dashboard for personal settings and tailored content. Personalization control interface may be presented based on a selection of a personal tab of a control interface.

Personalization control interface 1300 includes avatar 1305, user name 13010, and selectable elements associated with user profile statistics 1315, user profile post cards 1320, and user profile badges 1325. Personalization control interface 1300 also includes a messaging strip 1330 and a plurality of recommendations, such as recommendation 1335 and 1340.

User profile post cards 1320 relate to light weight widgets that can be added to the navigation bar. Selection of user profile post cards 1320 presents a pop up display including the postcard. User profile badges 1325 are based on behavior, discovering features of the digital television, connecting to other devices, energy saving use, most active badge and content viewing based on particular ratings.

While this disclosure has been particularly shown and described with references to exemplary embodiments thereof, it will be understood by those skilled in the art that various changes in form and details may be made therein without departing from the scope of the claimed embodiments.

What is claimed is:

1. A method for control of a digital television including presentation of a control interface, the method comprising:
    detecting, by a digital television, a first command for presentation of a control interface for the digital television;
    presenting, by the digital television, the control interface, wherein the control interface is presented to include
        an expanded tab element configured to provide a plurality of selectable elements associated with a category of the expanded tab element, wherein the expanded tab element includes a top portion including a symbol for the category, identification of the category and bottom portion including a plurality of graphical elements for the category, and wherein a highlight element is provided in the expanded configuration for navigation within the expanded tab, and
        a plurality of tab elements configured in a horizontal bar configuration on a display of the digital television, the expanded tab element presented within the horizontal bar;
    detecting, by the digital television, a second command for the control interface to select one of the plurality of tab elements, wherein the second command moves the highlight element of the expanded tab element to one of the plurality of tab elements in the horizontal bar configuration;
    displaying, by the digital television, a menu to personalize the digital television in response to the second command, wherein display of the menu includes accept and decline selections for name entry to receive a user name for settings entered, image for user profile, and wall paper selection for presentation of the control interface; and
    updating, by the digital television, presentation of the control interface in response to personalization wherein order of tab elements of the control interface and image data for tab elements is modified based on setup and personalized selections provided, wherein the digital television presents a selected tab element with expanded configuration and provides a plurality of graphical elements, wherein an expanded configuration of the selected tab element is presented to include a top portion including a symbol for the selected tab element, identification of the selected tab element and a bottom portion including a plurality of graphical elements for the selected tab element, wherein the highlight element is provided in the expanded configuration for navigation within the selected tab element.

2. The method of claim 1, wherein presenting the control interface includes presentation of the extended tab element and plurality of tab elements as at least one of a bottom bar and middle bar control interface overlaying display content of the digital television.

3. The method of claim 1, wherein the control interface includes graphical elements determined by the digital television based on one or more of a setup procedure and use of the digital television, wherein order of tab elements of the control interface is modified based on control interface personalization.

4. The method of claim 1, wherein presenting the control interface includes presentation of a tab element configured for personalization, at least one tile element for selecting content for presentation by the display device, tile element for settings and a tile for live content.

5. The method of claim 1, wherein the second command is a navigational command to select a tab element with respect to the control interface, wherein selection of a tab element launches at least one of a digital television application and camera application.

6. The method of claim 1, wherein the control interface for the digital television is configured as a hierarchical navigation pattern, wherein selections of tab elements present one or more sheet views by the digital television, wherein display of graphical elements as a sheet provides an additional layer of the control interface.

7. The method of claim 1, wherein displaying the menu includes presentation of a digital television setup interface configured to include a personalization screen, avatar selection screen, wallpaper selection screen and notification settings screen, wherein each screen includes a limited number of predefined options that may be easily highlighted with direction buttons of a remote control.

8. The method of claim 1, wherein personalizing the digital television includes presentation of a personalization interface associated with a user of the digital television including a dashboard for personal settings and tailored content.

9. The method of claim 1, wherein updating presentation of the control interface includes personalization of an avatar element of the control interface to include a user selected image and updating background image data for a personal tab of the control interface.

10. The method of claim 1, wherein the control interface is presented based on a selected user profile generated by a setup process for personalization of the digital television.

11. A digital television comprising:
a display configured to present a control interface; and
a processor coupled to the display, the processor configured to
detect a first command for presentation of a control interface for the digital television; present the control interface, wherein the control interface is presented to include
an expanded tab element configured to provide a plurality of selectable elements associated with a category of the expanded tab element, wherein the expanded tab element includes a top portion including a symbol for the category, identification of the category and bottom portion including a plurality of graphical elements for the category, and wherein a highlight element is provided in the expanded configuration for navigation within the expanded tab, and
a plurality of tab elements configured in a horizontal bar configuration on a display of the digital television, the expanded tab element presented within the horizontal bar;
detect a second command for the control interface to select one of the plurality of tab elements, wherein the second command moves the highlight element of the expanded tab element to one of the plurality of tab elements in the horizontal bar configuration; and
display a menu to personalize the digital television in response to the second command, wherein display of the menu includes accept and decline selections for name entry to receive a user name for settings entered, image for user profile, and wall paper selection for presentation of the control interface;
update presentation of the control interface in response to personalization wherein order of tab elements of the control interface and image data for tab elements is modified based on setup and personalized selections provided, wherein the digital television presents a selected tab element with expanded configuration and provides a plurality of graphical elements, wherein an expanded configuration of the selected tab element is presented to include a top portion including a symbol for the selected tab element, identification of the selected tab element and a bottom portion including a plurality of graphical elements for the selected tab element, wherein the highlight element is provided in the expanded configuration for navigation within the selected tab element.

12. The device of claim 11, wherein presenting the control interface includes presentation of the extended tab element and plurality of tab elements as at least one of a bottom bar and middle bar control interface overlaying display content of the digital television.

13. The device of claim 11, wherein the control interface includes graphical elements determined by the digital television based on one or more of a setup procedure and use of the digital television, wherein order of tab elements of the control interface is modified based on control interface personalization.

14. The device of claim 11, wherein presenting the control interface includes presentation of a tab element configured for personalization, at least one tile element for selecting content for presentation by the display device, tile element for settings and a tile for live content.

15. The device of claim 11, wherein the second command is a navigational command to select a tab element with respect to the control interface, wherein selection of a tab element launches at least one of a digital television application and camera application.

16. The device of claim 11, wherein the control interface for the digital television is configured as a hierarchical navigation pattern, wherein selections of tab elements present one or more sheet views by the digital television, wherein display of graphical elements as a sheet provides an additional layer of the control interface.

17. The device of claim 11, wherein displaying the menu includes presentation of a digital television setup interface configured to include a personalization screen, avatar selection screen, wallpaper selection screen and notification settings screen, wherein each screen includes a limited number of predefined options that may be easily highlighted with direction buttons of a remote control.

18. The device of claim 11, wherein personalizing the digital television includes presentation of a personalization interface associated with a user of the digital television including a dashboard for personal settings and tailored content.

19. The device of claim 11, wherein updating presentation of the control interface includes personalization of an avatar element of the control interface to include a user selected image and updating background image data for a personal tab of the control interface.

20. The device of claim 11, wherein the control interface is presented based on a selected user profile generated by a setup process for personalization of the digital television.

* * * * *